(12) United States Patent
Tamura et al.

(10) Patent No.: US 11,420,472 B2
(45) Date of Patent: Aug. 23, 2022

(54) FRONT AXLE BEAM AND PRODUCTION METHOD THEREOF

(71) Applicant: NIPPON STEEL CORPORATION, Tokyo (JP)

(72) Inventors: Kenji Tamura, Tokyo (JP); Kenji Imanishi, Tokyo (JP); Sam Soo Hwang, Tokyo (JP); Kunihiro Yabuno, Tokyo (JP); Kunihiro Yoshida, Tokyo (JP); Koichiro Ishihara, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 358 days.

(21) Appl. No.: 16/498,168

(22) PCT Filed: Apr. 3, 2018

(86) PCT No.: PCT/JP2018/014181
§ 371 (c)(1),
(2) Date: Sep. 26, 2019

(87) PCT Pub. No.: WO2018/186372
PCT Pub. Date: Oct. 11, 2018

(65) Prior Publication Data
US 2020/0023424 A1    Jan. 23, 2020

(30) Foreign Application Priority Data

Apr. 5, 2017 (JP) .............................. JP2017-074880

(51) Int. Cl.
*B60B 35/06* (2006.01)
*B21J 5/02* (2006.01)
(Continued)

(52) U.S. Cl.
CPC ................. *B60B 35/06* (2013.01); *B21J 5/02* (2013.01); *B21K 1/12* (2013.01); *B60B 35/12* (2013.01); *B60G 9/04* (2013.01); *B60G 2206/30* (2013.01)

(58) Field of Classification Search
CPC ........... B21K 1/12; B60B 35/06; B60B 35/12; B60G 9/04; B60G 2206/30;
(Continued)

(56) References Cited

U.S. PATENT DOCUMENTS 5,741,027 A * 4/1998 Stroh ...................... B60B 35/06
                                                            180/905
6,196,563 B1    3/2001 Haycraft
(Continued)

FOREIGN PATENT DOCUMENTS

GB          2163193 A *  2/1986  ............... E04C 3/02
GB          2304744 A *  3/1997  ............... E04C 3/06
(Continued)

OTHER PUBLICATIONS

ISR issued in Int'l, application No. PCT/JP2018/014181, dated Jul. 10, 2018.

*Primary Examiner* — Jason R Bellinger
(74) *Attorney, Agent, or Firm* — Greer Burns & Crain Ltd.

(57) ABSTRACT

In a pressing step, a first forged product is pressed by a first die, and thereby, a second forged product including a rough flange having a thickness-changing portion is produced. The thickness-changing portion includes a front part protruding frontward from a side of a rough web part and a rear part protruding rearward from the side of the rough web part. Each of the front part and the rear part includes a first part, and a second part that is thicker than the first part and is located farther from the rough web part than the first part. In the pressing step, at least a part of the rough flange that is
(Continued)

above or below the web part (thick part) is pressed by the first die, whereby the material of the first forged product in the part is caused to flow frontward and rearward, and the thickness-changing portion is formed.

5 Claims, 6 Drawing Sheets

(51) Int. Cl.
    *B21K 1/12*     (2006.01)
    *B60G 9/04*     (2006.01)
    *B60B 35/12*     (2006.01)

(58) Field of Classification Search
    CPC ....... B60G 2206/312; E04C 2003/0452; B61F 1/12; B61F 3/02; B61F 5/04
    See application file for complete search history.

(56) References Cited

U.S. PATENT DOCUMENTS

2020/0023427 A1* 1/2020 Tamura ..................... B21J 5/02
2020/0406680 A1* 12/2020 Suzuki .................. B60G 11/113

FOREIGN PATENT DOCUMENTS

| JP | 58164907 A | 9/1983 | |
|---|---|---|---|
| JP | 06190492 A | 7/1994 | |
| JP | 2003285771 A | 10/2003 | |
| JP | 2009106955 A | 5/2009 | |
| WO | WO-9520081 A1 * | 7/1995 | ........... B62D 29/008 |

* cited by examiner

FRONT AXLE BEAM AND PRODUCTION METHOD THEREOF

This is a National Phase Application filed under 35 U.S.C. § 371, of International Application No. PCT/JP2018/014181, filed Apr. 3, 2018, the contents of which are incorporated by reference.

TECHNICAL FIELD

The present invention relates to a front axle beam and a production method thereof.

BACKGROUND ART

Usually, front wheels of a vehicle body (for example, front wheels of a motor truck, a bus or the like, excluding motor cycles) are attached to a front axle beam (which will be hereinafter referred to as a "front axle" in some cases), and the front axle beam with the front wheels attached thereto is used to support the vehicle body. The front axle is important as a part for transmitting the load of the vehicle body to the right and left front wheels and as a structure maintaining part. The front axle keeps the wheels in fixed positions and ensures steerability of the front wheels, thereby ensuring driving stability. Also, at a time of braking, the front axle functions as a braking force transmission route. Thus, the front axle is a part which strongly affects traveling performance, steering performance and braking performance. The front axle is required to have high rigidity and therefore is heavy. From the viewpoint of fuel efficiency, on the other hand, weight reduction of the front axle is demanded.

Figure 2:
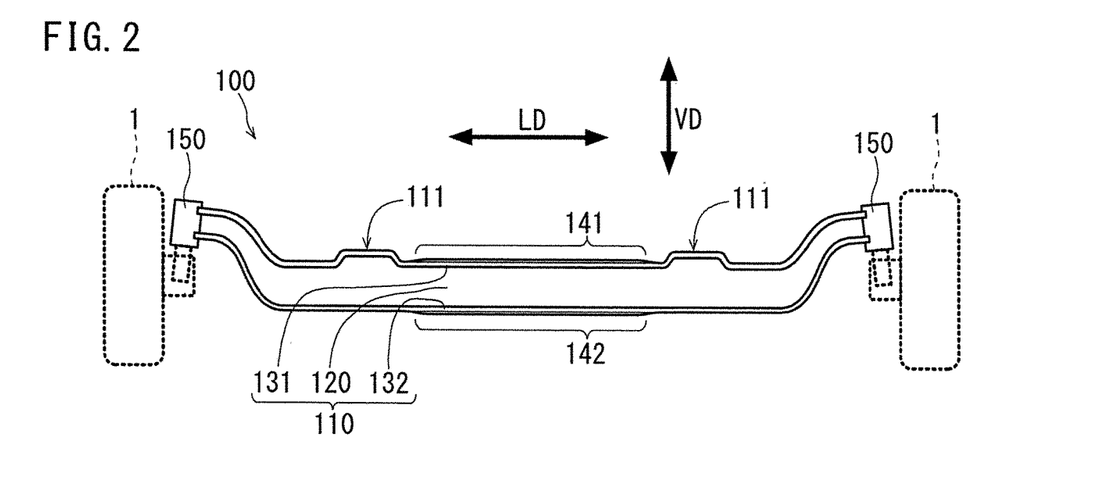
FIG. 2 is a view schematically showing the front side of the front axle shown in FIG. 1.

For driving stability, generally, heavy parts are arranged at low levels with respect to the vehicle height direction. Therefore, it is preferred that an engine, which is to be mounted on the front axle, is positioned at a low level with respect to the vehicle height direction. On both ends of the front axle, king-pin attachment parts are provided. An underbody is connected to the front wheels. Kingpins pass through the respective king-pin attachment parts along the body height direction from above and are inserted into the underbody attached to the front wheels. Thus, the kingpins connect the front axle and the wheels together. In this structure, when the vehicle body is steered, the front wheels turn about the respective kingpins. To form this structure of the vehicle body, the front axle is, for example, shaped like a bow of which center portion with respect to the vehicle width direction is at a low level and of which end portions with respect to the vehicle width direction are at a high level as shown in FIG. 2. The front axle has an H-shaped cross section, but unlike an H-steel, the front axle is not produced by a universal rolling machine. This is because it is impossible to form the bow-like shape by using a universal rolling machine.

Figure 10:
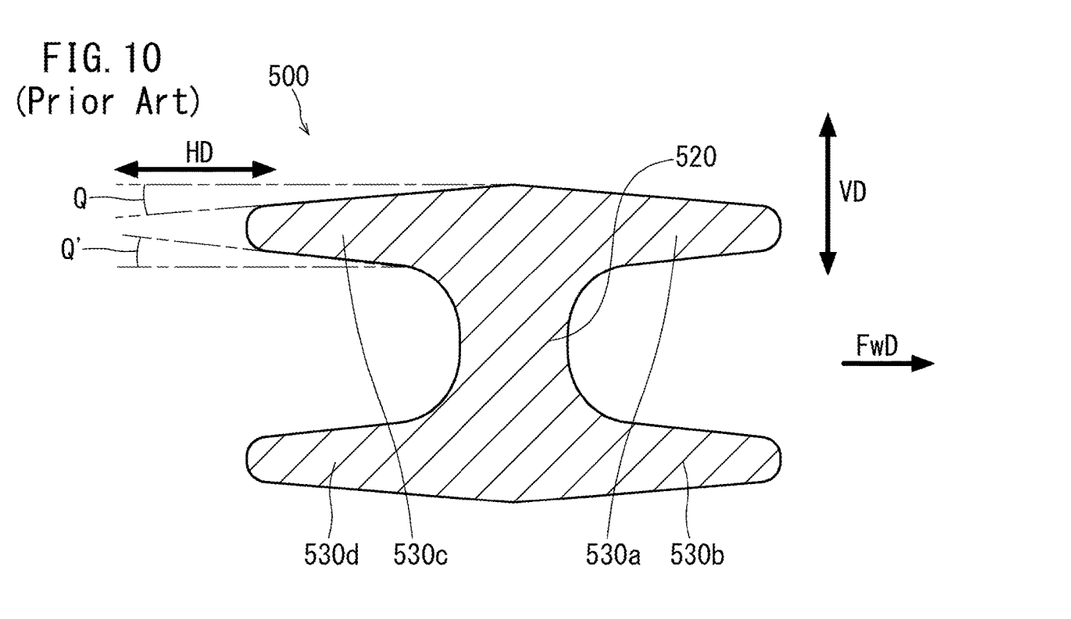
FIG. 10 is a view schematically showing a cross section of a conventional front axle.

A front axle is usually produced by die forging. In a case of producing a front axle by die forging, it is necessary to make draft angles Q and Q' as shown in FIG. 10, for example, for release of the product from the dies. This creates limitations on the shape of the front axle and eventually constrains improvement of the front axle in rigidity.

Japanese Patent Application Publication No. 2003-285771 (Patent Literature 1) provides a front axle that decreases aerodynamic drag while the vehicle is running. The object of the invention disclosed in Patent Literature 1 is to decrease aerodynamic drag and thereby to improve fuel efficiency.

Methods for producing a front axle have been provided up to now. Japanese Patent Application Publication No. 2009-106955 (Patent Literature 2) discloses a method for producing an axle beam with a right and a left spring attachment seat. In this production method, one of the spring attachment seats is press formed at a first pressing step, and the other spring attachment seat is press formed at a second pressing step.

One of the measures to reduce the weight of a front axle is increasing the rigidity of the front axle. An increase in the rigidity of a front axle will permit the front axle to have rigidity comparable to the rigidity of a conventional front axle while having a lighter weight and/or a smaller size. An increase in the rigidity of the front axle also will permit the front axle to improve various properties associated with rigidity while keeping the size and/or the weight same as those of a conventional front axle. Therefore, a new technique for increasing the rigidity of a front axle is demanded.

Meanwhile, around such a front axle, an engine and movable parts for steering are densely arranged. Accordingly, the front axle is required to be fitted in a small space without interfering with these surrounding parts. Therefore, a technique for increasing the rigidity of a front axle without increasing the size of the front axle is especially demanded.

CITATION LIST

Patent Literatures

Patent Literature 1: Japanese Patent Application Publication No. 2003-285771
Patent Literature 2: Japanese Patent Application Publication No. 2009-106955

SUMMARY OF INVENTION

Technical Problem

In the circumstances, an object of the present invention is to provide a front axle beam with increased rigidity, and a production method of the front axle beam.

Solution to Problem

A production method according to an embodiment of the present invention is a method for producing a front axle beam including a beam part, the beam part including a web part and flanges joined on both sides of the web part and having an H-shaped cross section. In the production method, a material is die forged by forging dies which are paired with each other at a central axis of the web part to form the web part and the flanges such that at least one of the flanges has a maximum thickness at its joined part to the web part, in the cross section of the beam part. Further, the joined part of the flange to the web part is pressed by a first die from an outer side in a web part extending direction in the cross section of the beam part to form thick parts in regions outside of the joined part of the flange to the web part.

A front axle beam according to an embodiment of the present invention includes a beam part including a web part and flanges joined on both sides of the web part and having an H-shaped cross section. In the cross section of the beam part, at least one each of the flanges includes a thin part in a central region with a 50% width of an entire flange width, the thin part having a thickness smaller than a maximum thickness in a region outside of the central region.

Advantageous Effects of Invention

The present invention provides a front axle beam with high rigidity. The production method according to the present invention facilitates production of the front axle beam.

DETAILED DESCRIPTION OF EMBODIMENTS

As a result of the inventors' earnest consideration, they found it possible to increase the rigidity of a front axle by adjusting the cross-sectional shape of the front axle. They also found a method for producing a front axle with high rigidity. The present invention has been made based on these findings.

A production method according to an embodiment of the present invention is a method for producing a front axle beam including a beam part, the beam part including a web part and flanges joined on both sides of the web part and having an H-shaped cross section. In the production method, a material is die forged by forging dies which are paired with each other at a central axis of the web part to form the web part and the flanges such that at least one of the flanges has a maximum thickness at its joined part to the web part, in the cross section of the beam part. Further, the joined part of the flange to the web part is pressed by a first die from an outer side in a web part extending direction in the cross section of the beam part to form thick parts in regions outside of the joined part of the flange to the web part.

In the production method, the first die may press the joined part of the flange to the web part from an outer side in the web part extending direction in the cross section of the beam part to widen the flange in the cross section of the beam part.

In the production method, it is preferred that the first die presses the joined part of the flange to the web part from an outer side in the web part extending direction in the cross section of the beam part while second dies are pinching the web part and holding the flanges.

In the production method, it is preferred that the first die presses parts of the flange to be formed into the thick parts when pressing the joined part of the flange to the web part from an outer side in the web part extending direction in the cross section of the beam part.

A front axle beam according to an embodiment of the present invention includes a beam part including a web part and flanges joined on both sides of the web part and having an H-shaped cross section. In the cross section of the beam part, at least one of the flanges includes a thin part in a central region with a 50% width of an entire flange width from the web part, the thin part having a thickness smaller than a maximum thickness of a region outside of the central region.

In another aspect, a production method according to an embodiment of the present invention is a method for producing a front axle beam including a beam part and two king-pin attachment parts provided to both ends of the beam part with respect to a length direction of the beam part. The beam part includes a web part extending in the length direction, a first flange protruding frontward and rearward from an upper side of the web part, and a second flange protruding frontward and rearward from a lower side of the web part. The production method comprises: a die forging step of die forging a steel material to form a first forged product including a rough web part to be formed into the web part, a first rough flange protruding frontward and rearward from an upper side of the rough web part, and a second rough flange protruding frontward and rearward from a lower side of the rough web part; and a pressing step of pressing the first forged product in an up-down direction to form a second forged product including at least one rough flange with a specific thickness-changing portion. At least one of the first rough flange and the second rough flange of the first forged product includes a shape-changing portion to be formed into the thickness-changing portion. The shape-changing portion has a maximum thickness in a region above or below the rough web part. The thickness-changing portion of the second forged product includes a front part protruding frontward from the side of the rough web part and a rear part protruding rearward from the side of the rough web part. Each of the front part and the rear part includes a first part, and a second part that is thicker than the first part and is located farther from the rough web part than the first part. In the pressing step, a first die presses at least the region of the shape-changing portion above or below the rough web part to cause the material in the region to flow frontward and rearward and thereby form the thickness-changing portion.

In the production method, the thickness-changing portion of the second forged product has a greater frontward/rearward dimension than a frontward/rearward dimension of the shape-changing portion of the first forged product.

In the production method, the pressing step is preferably performed while the rough web part of the first forged product is pinched between two second dies from front and rear.

In the production method, it is preferred that each of the first rough flange and the second rough flange of the first forged product includes a shape-changing portion, and in the pressing step, each of the first rough flange and the second rough flange obtains a thickness-changing portion.

In the production method, it is preferred that in the pressing step, when the shape-changing portion is pressed, other portions are also pressed for coining.

In another aspect, a front axle beam according to an embodiment of the present invention includes a beam part, and two king-pin attachment parts provided to both ends of the beam part with respect to a length direction of the beam part. The beam part includes a web part extending in the length direction, a first flange protruding frontward and rearward from an upper side of the web part, and a second flange protruding frontward and rearward from a lower side of the web part. At least one of the first flange and the second flange includes a specific thickness-changing portion. The thickness-changing portion includes a front part protruding frontward from the side of the web part, and a rear part protruding rearward from the side of the web part. Each of the front part and the rear part includes a first part, and a second part that is thicker than the first part and is located farther from the web part than the first part.

An embodiment of the present invention will hereinafter be described. The present invention is not limited to the embodiment below.

In this specification, unless any specific mention is made, directions concerning a front axle and components thereof mean directions when the front axle is used. For example, unless any specific mention is made, an up-down direction concerning a front axle means the up-down direction when the front axle is used. In other words, the up-down direction concerning the front axle means the vehicle height direction. Likewise, a right-left direction concerning the front axle and a front-rear direction concerning the front axle mean these directions when the front axle is used. Specifically, the right-left direction concerning the front axle means the vehicle width direction. The front-rear direction concerning the front axle means the vehicle length direction. The front axle includes a beam part having an H-shaped cross section. This beam part includes a plate-like web part, and plate-like flanges protruding from both sides of the web part. When the front axle is used, the beam part is placed horizontally. In a cross section of the front axle, the web part extends in the up-down direction, and the flanges protrude in the front-rear direction. Accordingly, in the cross section of the front axle, the up-down direction is the web part extending direction, and the front-rear direction is a direction perpendicular to the web part extending direction. Further, a front side and a rear side of the front axle conform with the front side and the rear side of the vehicle in which the front axle is used. However, in a case where the front axle has a symmetric shape with respect to the front-rear direction, either one of these sides is considered as a front side, and the other side is considered as a rear side. Moreover, unless any specific mention is made, directions concerning an intermediate product of the front axle (a first or second forged product) and components thereof conform with the directions concerning the front axle as a final product.

(Production Method of Front Axle Beam)

A production method according to an embodiment is a method for producing a front axle (front axle beam) including a beam part, and two king-pin attachment parts provided to both ends of the beam part with respect to the length direction of the beam part. The beam part includes a web part extending in the length direction of the beam part, a first flange protruding frontward and rearward from the upper side of the web part, and a second flange protruding frontward and rearward from the lower side of the web part. Thus, the production method according to the embodiment is a method for producing a front axle (front axle beam) including a beam part that includes a web part and flanges joined on both sides of the web part and has an H-shaped cross section. As will be described later, this production method includes a die forging step and a pressing step that are performed in this order. In this disclosure, joining means merely unifying but does not always mean connecting by welding, fastening or the like.

The die forging step is a step of producing a first forged product (for example, a forged product 201 shown in FIG. 5A) by die forging a steel material. The first forged product includes a rough web part to be formed into the web part, a first rough flange protruding frontward and rearward from the upper side of the rough web part, and a second rough flange protruding frontward and rearward from the lower side of the rough web part. The first and second rough flanges are to be formed into the first flange and the second flange of the front axle, respectively.

At least one of the first and second rough flanges of the first forged product includes a shape-changing portion to be formed into a thickness-changing portion, which will be described later. The shape-changing portion has a maximum thickness in a region above or below the first or second rough flange. In other words, the shape-changing portion has a thick part, which is thicker than any other part, in a region near the rough web part (at least above or below the rough web part). The thickness of the shape-changing portion of the rough flange is the dimension thereof along the up-down direction of the first forged product.

Thus, in the production method according to the embodiment, a material (steel material) is die forged by a pair of forging dies. The forging dies are paired with each other at the center line of the web part (rough web part). By the die forging, the web part (rough web part) and the flanges are formed such that at least one of the flanges has a maximum thickness in its joined part to the web part.

Usually, the first forged product, which is produced by die forging, has flash. Therefore, a flash-trimming step to remove the flash may be performed between the die forging step and the pressing step. The removal of flash may be performed by any flash-trimming method, and a conventional method may be adopted. In a case where such a flash-trimming step is performed, the first forged product with the flash removed is sent to the pressing step.

The pressing step is a step of producing a second forged product (for example, a forged product 202 shown in FIG. 6A) by pressing the first forged product in the up-down direction by at least one first die. The second forged product includes at least one rough flange (at least one specific rough flange) having a specific thickness-changing portion.

The thickness-changing portion of the second forged product includes a front part protruding frontward from a side of the rough web part, and a rear part protruding rearward from the side of the rough web part. Each of the front part and the rear part includes a first part, and a second part that is thicker than the first part and is located farther from the rough web part than the first part. Thus, each of the front part and the rear part includes a thick part in a region distant from the rough web part.

In the pressing step, at least the thick part of the shape-changing portion of the first forged product, which lies above or below the rough web part, is pressed by the first die, and thereby, the material in the thick part is pushed and caused to flow frontward and rearward. In this way, the thickness-changing portion is formed.

There is no limit to the first die, and the first die may be anything that permits the shape-changing portion to form into the thickness-changing portion. For example, the first die has a bulge that pushes the thick part of the shape-changing portion to cause the material to flow.

Thus, in the production method according to the embodiment, the joined part of the flange (rough flange) to the web part (rough web part) is pressed from an outer side in the web part extending direction in a cross section of the beam part. Thereby, thick parts are formed on the flange, in regions outside of the joined part to the web part.

The first and second forged products include a rough beam part to be formed into the beam part. In the following paragraphs, the length direction of the rough beam part will be referred to as "length direction LD" in some cases. The front-rear direction concerning the front axle and the forged products will be referred to as "front-rear direction HD", and the up-down direction concerning the front axle and the forged products will be referred to as "up-down direction VD".

The thickness-changing portion may extend over the entire length of the rough beam part (entirely in the length direction LD) or may lie only partly in the length direction LD. The front axle typically has two spring attachment seats. The thickness-changing portion may be formed in the entire region or some of the region between the two spring attachment seats. The shape-changing portion is formed in a position appropriate to the position where the thickness-changing portion is to be formed.

In the production method, it is possible to form a thickness-changing portion having the above-described shape. As will be described later, this thickness-changing portion permits an increase in the rigidity of the front axle without causing an increase in the weight of the front axle.

In this specification, an inner side and an outer side of a flange (or a rough flange) mean the inner side and the outer side with respect to the up-down direction VD of the front axle or the forged product, unless it is inconsistent with the context. Regarding the flange (or the rough flange) protruding from the upper side of the web part (or the rough web part), the inner side means the lower side thereof, and the outer side means the upper side thereof. Regarding the flange (or the rough flange) protruding from the lower side of the web part (or the rough web part), the inner side means the upper side thereof, and the outer side means the lower side thereof.

The thickness-changing portion of the second forged product has a greater dimension in the front-rear direction HD than the dimension in the front-rear direction HD of the shape-changing portion of the first forged product. Thus, when the shape-changing portion is formed into the thickness-changing portion, the amount of protrusion of the shape-changing portion in the front-rear direction HD may be increased.

As described above, in the production method according to the embodiment, the joined part of the flange (rough flange) to the web part (rough web part) is pressed by the first die from an outer side in the web part extending direction in a cross section of the beam part. The dimension of the flange in the front-rear direction may be increased in this way.

The pressing step may be performed while the rough web part of the first forged product is pinched between two second dies arranged on the front and rear sides of the first forged product along the front-rear direction HD.

Thus, in the production method according to the embodiment, the web part (rough web part) is pinched between the second dies, and thereby, the flanges (rough flanges) are supported by the second dies. In this state, the joined part of the flange (rough flange) to the web part may be pressed by the first die from an outer side in the web part extending direction in a cross section.

Each of the first rough flange and the second rough flange of the first forged product may have a shape-changing portion. In this case, in the pressing step, each of the first rough flange and the second rough flange obtains a thickness-changing portion. Either the first rough flange or the second rough flange, but not both, of the first forged product may have a shape-changing portion. In this case, in the pressing step, only the first or second rough flange obtains a thickness-changing portion.

Typically, a coining step is performed after the pressing step. In the coining step, certain parts (for example, the spring attachment seats) are settled into particular shapes. In the production method according to the embodiment, the coining step may be performed at the same time as the pressing step. Specifically, in the pressing step, while the shape-changing portion is pressed, any other part may be also pressed into a particular shape. This arrangement permits this production method to keep from increasing the number of process steps, as compared with a conventional production method. In this case, the first dies may be used also as dies for the coining step.

Thus, in the production method according to the embodiment, when the joined part of the flange (rough flange) to the web part (rough web part) is pressed by the first die from an outer side in the web part extending direction in a cross section, the parts of the flange to be formed into the thick parts may be also pressed.

(Front Axle Beam)

A front axle (a front axle beam) according to an embodiment of the present invention is produced by the production method according to the embodiment. The description of the production method according to the embodiment applies to the front axle according to the embodiment, and the overlapping description will be omitted from the following description of the front axle. Also, the description of the front axle applies to the production method according to the embodiment. The front axle according to the embodiment may be produced by any other method than the production method according to the embodiment.

The front axle according to the embodiment has a beam part including a web part, and four flange parts joined on both sides of the web part, and the beam part has an H-shaped cross section. Each of the flange parts has a thin part in a central region near the web part. The central region is a region from the web part with a 50% width of the entire width of the flange part. The thin part is thinner than the maximum thickness in the region of the flange part outside of the central region. In this disclosure, joining means merely unifying and does not always mean connecting by welding, fastening or the like.

The front axle according to the embodiment includes not only the beam part but also two king-pin attachment parts provided to both ends of the beam part with respect to the length direction of the beam part. The beam part includes a first flange protruding frontward and rearward from the upper side of the web part, and a second flange protruding frontward and rearward from the lower side of the web part. At least one of the first flange and the second flange has a thickness-changing portion. The thickness-changing portion includes a front part protruding frontward from the side of the web part, and a rear part protruding rearward from the side of the web part. Each of the front part and the rear part includes a first part, and a second part that is thicker than the first part and is farther from the web part than the first part.

As mentioned above, each of the first flange and the second flange may include a thickness-changing portion. Alternatively, only the first flange may include a thickness-changing portion, or only the second flange may include a thickness-changing portion.

Generally, bending rigidity is evaluated by the value of second moment of area, and the second moment of area is proportional to the cube of the distance from the bending neutral line of the workpiece. Accordingly, increasing the cross-sectional area of a portion far from the bending neutral line is effective to improve rigidity. The above-described thickness-changing portion has thick parts in regions far from the web part. In other words, each of the flange parts of at least one of the flanges has a thin part in a region near the web part and a thick part in a region far from the web part. In this case, in a cross section of the front axle, the center of gravity of the flange part is located at a position relatively far from the center of gravity of the beam part (when compared with the positional relation between the center of gravity of the flange part and the center of gravity of the beam part in a conventional front axle). Accordingly, it is possible to increase the second moment of area of the flange part as compared with a conventional flat-plate-shaped flange part of a conventional front axle. Thereby, according to the embodiment, it becomes possible to improve the rigidity (bending rigidity in the front-rear direction HD and bending rigidity in the up-down direction VD) of the front axle without increasing the weight thereof. Further, it is possible to increase the polar moment of inertia of the flange part as compared with a flange part of a conventional front axle. Thereby, according to the embodiment, it becomes possible to improve the torsional rigidity of the front axle without increasing the weight thereof. In other words, it becomes possible to improve the rigidity (bending rigidity and torsional rigidity) per unit weight of the front axle. Further, by using the thickness-changing portion, it becomes possible to achieve high rigidity of the front axle without increasing the size of the front axle.

Regarding the surface of the thickness-changing portion, usually, the outer surface of the front axle with respect to the up-down direction VD inclines outward in the up-down direction VD and thereafter inclines inward in the up-down direction VD as the distance from the web part increases. When the thickness-changing portion is viewed horizontally from a side in which the flange protrudes, a part of the outer surface thereof with respect to the up-down direction VD is invisible. This invisible part corresponds to a part with an inverse draft in a die forging step, and it is difficult to form the thickness-changing portion only by die forging. For this reason, when the thickness-changing portion is to be formed by the production method including a die forging step, it is necessary to perform the above-described pressing step. On the contrary, the thickness-changing portion can be formed easily by the above-described die forging step and pressing step. Accordingly, the front axle according to the embodiment has an advantage in terms of manufacturing.

Now, the thickness of a flange in the joint between the flange and the web part is defined as follows. In a cross section of the beam part, the outline of the base of the web part is not straight but curved. That is, the corner R at the base of the web part is in the shape of a circular arc. Regarding each of the flanges, the middle point of the thickness at a part of the flange that is near the web part but out of contact with the web part is determined on each side of the web part. The direction in which the line connecting the middle points of the thickness on both sides of the web part extends is referred to as a flange extending direction. A tangent line to the corner R at a tangent point which is closer to the center of the web part forms a greater angle with the flange extending direction. The tangent point at which the tangent line to the corner R forms an angle of 10 degrees with the flange extending direction is determined on each side of the web part. The straight line connecting such tangent points on both sides of the web part is considered as a boundary of the web part. Based on this boundary, the thickness of the flange is evaluated.

A cross section (a section along a line perpendicular to the length direction LD) of a conventional front axle 500 is shown in FIG. 10. When the front axle is produced by die forging, dies (forging dies) are moved in directions in which flange parts 530a to 530d protrude (in the front-rear direction HD (direction perpendicular to the extending direction of a web part 520 in cross section)). Therefore, draft angles are provided for the flange parts 530a to 530d. In FIG. 10, draft angles Q and Q' to the die forging direction (front-rear direction HD) are shown. Because of these draft angles Q and Q', each of the flange parts 530a to 530d of the conventional front axle becomes thinner as the distance from its edge decreases. In other words, in the conventional front axle 500, each of the flange parts 530a to 530d becomes thicker as the distance from the center of the web part 520 decreases. According to the embodiment, on the other hand, each of the flange parts has a thin part in a region near the web part and has a thick part in a region far from the web part.

As described above, the thickness-changing portion may be formed in at least some part of the region (in some part of the region or in the entire region) between the two spring attachment seats. For example, the thickness-changing portion may be formed in 50% or more of the region between the two spring attachment seats (based on the dimension in the length direction LD).

(Producing Apparatus)

In another aspect, the present invention relates to an apparatus for producing a front axle. The producing apparatus includes the above-described dies used in the pressing step, and a mechanism for moving the dies in the above-described way. As the mechanism for moving the dies, a mechanism used in a conventional pressing machine may be used.

Some exemplary embodiments of the present invention will hereinafter be described with reference to the drawings. The embodiments which will be described below are only examples, and some parts of the embodiments below may be replaced with some parts of the above-described structure. In the following description, the same parts and members are denoted by the same reference numerals, and a repetitious description may be omitted. The drawings below are all schematic diagrams, and some parts that are unnecessary for the description may be omitted.

First Embodiment

Figure 1:
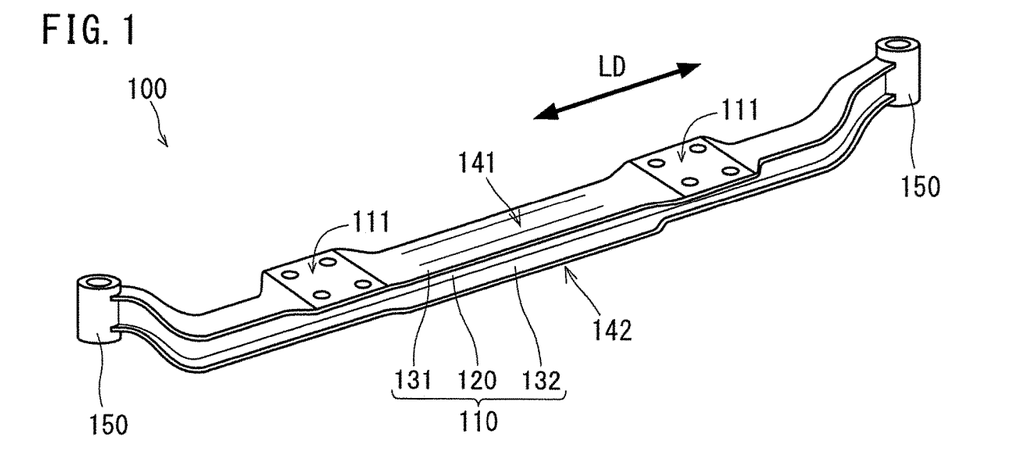
FIG. 1 is a perspective view schematically showing an exemplary front axle according to a first embodiment.
Figure 3:
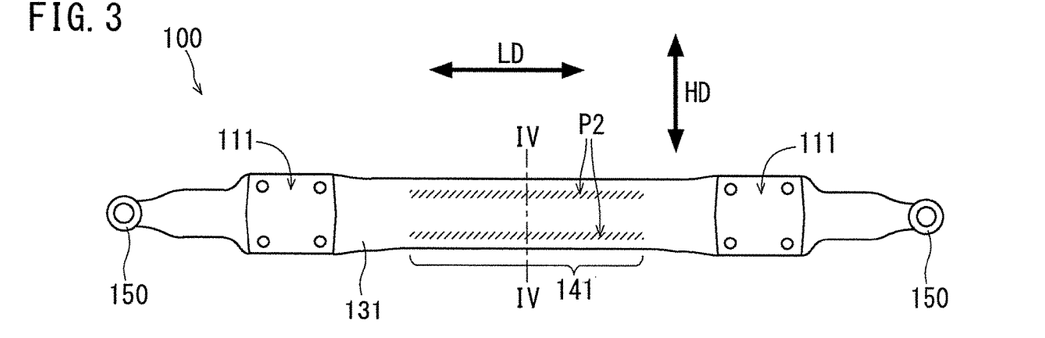
FIG. 3 is a view schematically showing the top side of the front axle shown in FIG. 1.
Figure 4:
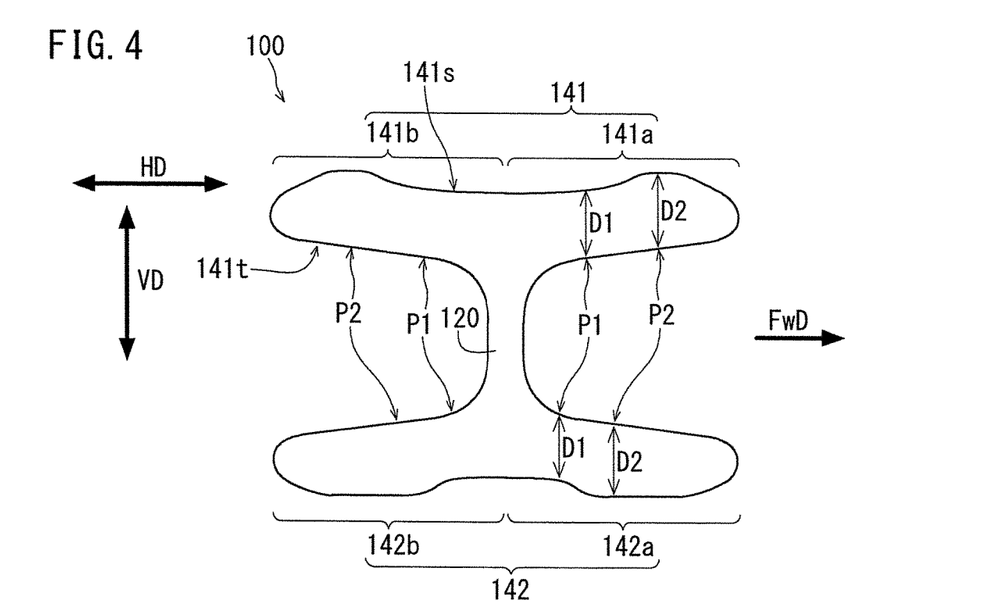
FIG. 4 is a view schematically showing a cross section of the front axle shown in FIG. 1.

As a first embodiment, an exemplary front axle according to the present invention will be described. FIG. 1 is a perspective view of a front axle 100 according to the first embodiment. FIG. 2 is a front view of the front axle 100, that is, a view when the front axle 100 is viewed horizontally from front. FIG. 3 is a top view of the front axle 100. FIG. 4 is a cross-sectional view along the line IV-IV in FIG. 3. In FIG. 4, hatching is omitted. In some of these drawings and the drawings which will hereinafter be referred to, the frontward direction from the front axle 100 (or a first forged product 201 or a second forged product 202) is denoted by FwD. In some of the drawings, the up-down direction is denoted by VD, and the front-rear direction is denoted by HD. In some of the drawings, also, the length direction of the beam part 110 (or a rough beam part 210) is denoted by LD.

With reference to FIG. 1, the front axle (front axle beam) 100 includes a beam part 110, and two king-pin attachment parts 150 provided to both ends of the beam part 110 with respect to the length direction LD of the beam part 110. Each of the king-pin attachment parts 150 has a through-hole in which a kingpin is to be inserted. Typically, the front axle 100 has a shape that is substantially symmetric with respect to the center of the vehicle width, and the whole shape is generally like a bow. As shown in FIG. 2, each of the king-pin attachment parts 150 is connected to a tire 1 via the kingpin.

The beam part 110 includes a web part 120 extending in the length direction LD, a first flange 131 protruding frontward and rearward from the upper side of the web part 120, and a second flange 132 protruding frontward and rearward from the lower side of the web part 120. The first and second flanges 131 and 132 include thickness-changing portions 141 and 142, respectively. From another point of view, the beam part 110, which includes the web part 120 and the flanges 131 and 132 joined on both sides of the web part 120, has an H-shaped cross section.

As shown in FIG. 4, the thickness-changing portion 141 includes a front part 141a protruding frontward from the side of the web part 120, and a rear part 141b protruding rearward from the side of the web part 120. Each of the front part 141a and the rear part 141b includes a first part P1 and a second part P2. The second part P2 (thick part) is thicker than the first part P1 that is located near the web part 120, and the second part P2 is located farther from the web part 120 than the first part P1.

Similarly, the thickness-changing portion 142 includes a front part 142a protruding frontward from the side of the web part 120, and a rear part 142b protruding rearward from the side of the web part 120. As with the front part 141a and the rear part 141b, each of the front part 142a and the rear part 142b includes a first part P1 and a second part P2 (thick part).

The thicknesses of the thickness-changing portions 141 and 142 mean the respective dimensions thereof along the up-down direction VD of the front axle 100. In FIG. 4, the thicknesses of the first parts P1 of the front part 141a and the front part 142a are denoted by D1, and the thicknesses of the second parts P2 of the front part 141a and the front part 142a are denoted by D2. In each of the front parts and the rear parts, the thickness D1 of the first part P1 and the thickness D2 of the second part P2 are compared with each other.

Figure 9:
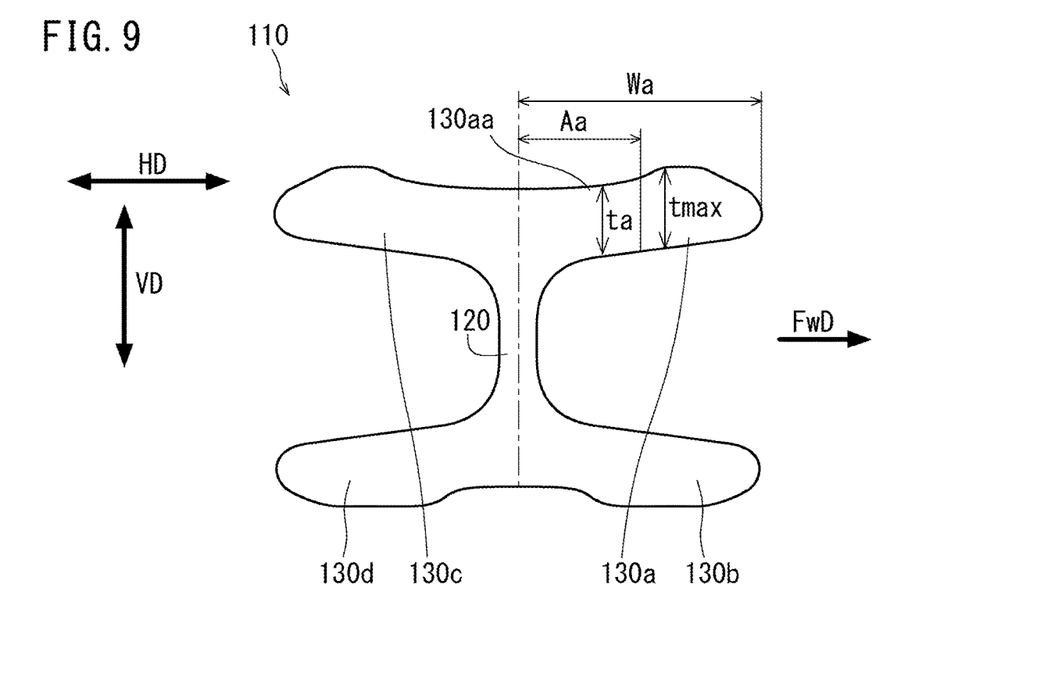
FIG. 9 is a view schematically showing a cross section of a front axle according to the embodiment of the present invention.

From another point of view, the front axle 100 according to the first embodiment is described as follows. FIG. 9 corresponds to FIG. 4, and FIG. 9 shows a cross section of the beam part 110 of the front axle 100 according to the embodiment. The beam part 110 has an H-shaped cross section. The beam part 110 includes a web part 120, and four flange parts 130a to 130d joined to both sides of the web part 120. For example, the flange part 130a has a thin part 130aa in its central region Aa near the web part 120. The central region Aa of the flange part 130a is a region from the web part 120 with a 50% width of the entire width Wa of the flange part 130a. The thickness to of the thin part 130aa is thinner than the maximum thickness tmax of a region of the flange part 130a outside of the central region Aa.

FIGS. 1 to 4 show an exemplary case where the thickness-changing portion 141 and the thickness-changing portion 142 are asymmetric with each other in the up-down direction VD. However, the thickness-changing portions 141 and 142 may be symmetric with each other in the up-down direction VD. Because the front axle is wholly bow-shaped and because the kingpins are positioned in the upper part, a torsional load is generated when a frontward/rearward load is applied. However, the axis of rotation of the torsional load applied to the front axle does not always coincide with the center of web part as shown in FIG. 4, for example, and therefore, making the thickness-changing portions 141 and 142 asymmetric with each other results in an increase of rigidity in some cases. In the example shown in FIGS. 1 to 4, also, each of the thickness-changing portion 141 and the thickness-changing portion 142 is symmetric in the front-rear direction HD. However, each of the thickness-changing portions 141 and 142 may be asymmetric in the front-rear direction HD.

Regarding the surface of the thickness-changing portion 141, the outer surface 141s thereof with respect to the up-down direction VD inclines outward in the up-down direction VD and thereafter inclines inward in the up-down direction VD as the distance from the web part 120 increases. The surface of the thickness-changing portion 142 has a similar shape. Such a thickness-changing portion has an invisible part on the outer surface with respect to the up-down direction VD when viewed horizontally from a direction in which the first flange 131 protrudes. As mentioned above, it is difficult to form this invisible part only by die forging.

In the example shown in FIG. 4, the inner surface 141t of the thickness-changing portion 141 with respect to the up-down direction VD entirely inclines outward in the up-down direction VD. The inner surface of the thickness-changing portion 142 inclines in the same manner. However, the inclinations of these inner surfaces are not limited to the inclinations shown in FIG. 4.

As shown in FIG. 1, the first flange 131 includes two spring attachment seats 111. The two spring attachment seats 111 are arranged at an interval in such a manner to be positioned symmetrically with each other. Springs are placed on the spring attachment seats 111, and on top of the springs, a vehicle body (including an engine) is set. In the first embodiment, the thickness-changing portions 141 and 142 are formed in the region between the two spring attachment seats 111. However, the thickness-changing portions 141 and 142 may be formed in any other region.

In the cross section shown in FIG. 4, the corner between the inner surface 141t of the thickness-changing portion 141 and the surface of the web part 120 is round (in the shape of a circular arc). In FIG. 4, the boundary between the thickness-changing portion 141 (the first flange 131) and the web part 120 is a straight line connecting the ends of the circular arcs on the side of the inner surface 141t (the end of the circular arc on the side of the front part 141a and the end of the circular arc on the side of the rear part 141b). The boundary between the thickness-changing portion 142 (the second flange 132) and the web part 120 is defined in the same manner.

Second Embodiment

As a second embodiment, an example of a method for producing the front axle 100 shown in FIGS. 1-4 will hereinafter be described with reference to the drawings. This production method includes a die forging step and a pressing step, which will be described later, to be performed in this order. The die forging step and the pressing step are hot working that is performed with the workpiece heated.

In the die forging step, a first forged product is produced by die forging a steel material. There is no limit to the die forging step, and a conventional die forging step may be adopted. Typically, the first forged product obtained by the die forging step has flash. In the case where the first forged product has flash, a flash-trimming step is performed before the first forged product is subjected to the pressing step. There is no limit to the flash-trimming step, and a conventional flash-trimming step may be adopted.

Figure 5A:
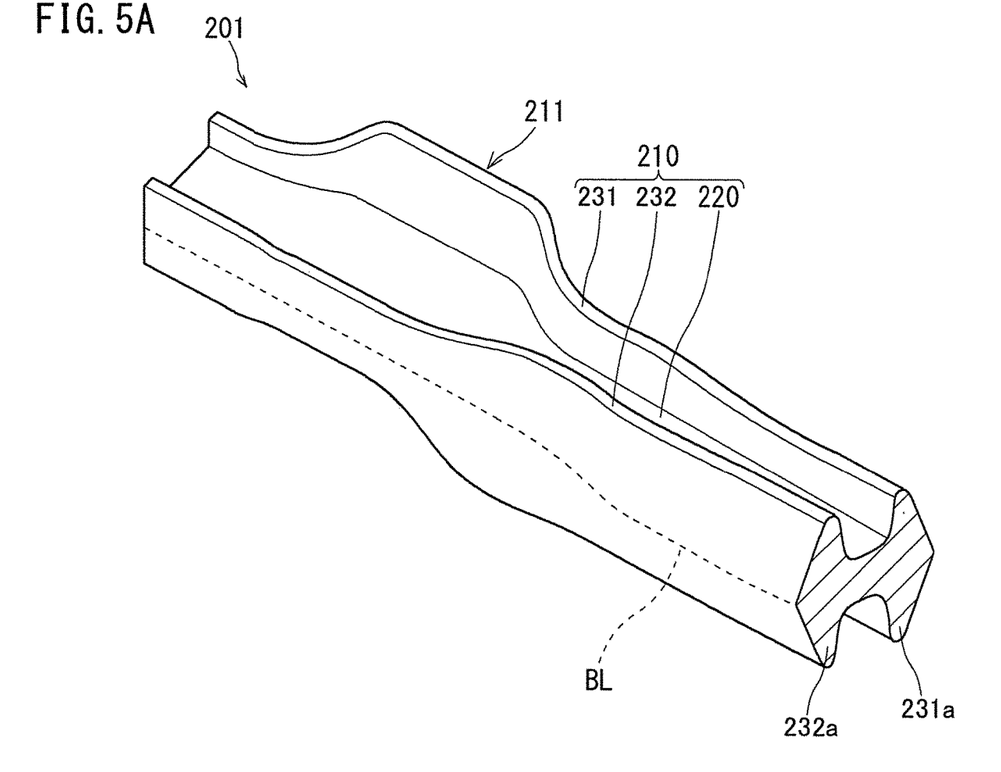
FIG. 5A is a perspective view schematically showing a part of an exemplary forged and flash-trimmed product produced by a production method according to a second embodiment.

FIG. 5A is a perspective view of a part of the first forged product 201 after subjected to the flash-trimming step, and in FIG. 5, a cross section of the first forged product 201 is seen. The first forged product 201 includes a rough beam part 210 to be formed into the beam part 110. The rough beam part 210 includes a rough web part 220 to be formed into the web part 120, a first rough flange 231 protruding frontward and rearward from the upper side of the rough web part 220, and a second rough flange 232 protruding frontward and rearward from the lower side of the rough web part 220. On the first rough flange 231, parts 211 to be formed into the spring attachment seats 111 are formed. In FIG. 5A, the dashed line indicates a flash line BL along which the flash has been trimmed.

The first rough flange 231 includes a shape-changing portion 231a, and the second rough flange 232 includes a shape-changing portion 232a. The shape-changing portions 231a and 232a are to be formed into the thickness-changing portions 141 and 142, respectively. Though the following description is mainly of the shape of the shape-changing portion 231a, the same applies to the shape-changing portion 232a.

Figure 5B:
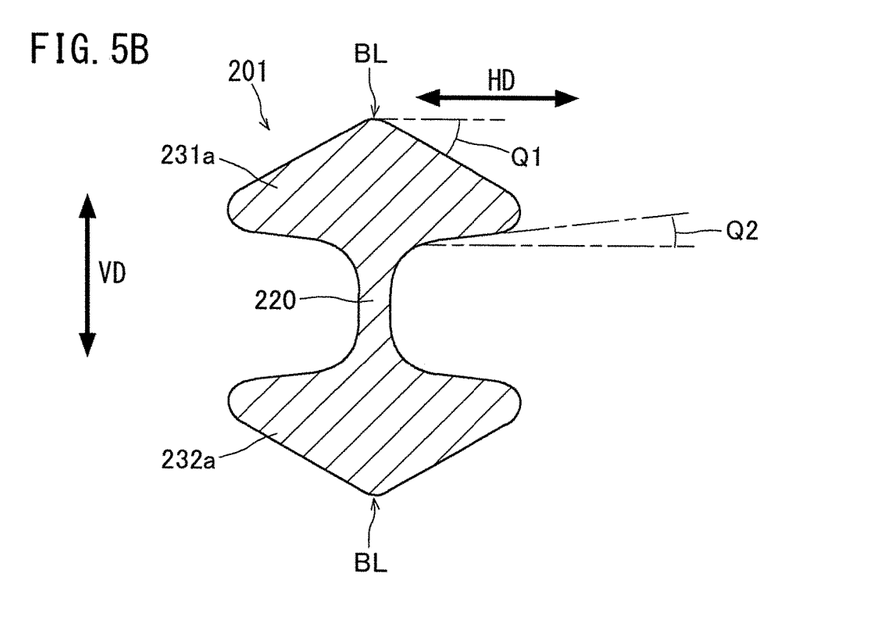
FIG. 5B is a view schematically showing a cross section of the forged product shown in FIG. 5A.

FIG. 5B shows a section passing through the shape-changing portions 231a and 232a (a section perpendicular to the length direction LD). As shown in FIG. 5B, the shape-changing portion 231a increases in thickness as the distance from the rough web part 220 decreases. More specifically, the shape-changing portion 231a increases in thickness as the distance from an edge thereof increases and as the distance from the flash line BL decreases, so that the thickness of the shape-changing portion 231a reaches a maximum at the flash line BL. The thickness of the shape-changing portion 231a reaches a maximum in a region above the rough web part 220 in the up-down direction VD. From another point of view, each of the first and second rough flanges 231 and 232 (the shape-changing portions 231a and 232a) has a maximum thickness at a joined part to the rough web part 220 (corresponding to the flash line BL). Accordingly, the cross section of the shape-changing portion 231a shown in FIG. 5B is angled like a chevron. This shape of the shape-changing portion 231 permits the material in the region near the rough web part 220 (the thick region) to flow during the pressing step, which will be described later, and thereby, the thickness-changing portion is formed.

The die forging step is carried out by moving dies (forging dies) frontward and rearward in the front-rear direction HD (in the direction perpendicular to the extending direction of the rough web part 220 in a cross section) in which the first and second rough flanges 231 and 232 protrude. The forging dies are paired with each other with the center line of the rough web part 220 (the flash line BL) defined as a contact face. Therefore, draft angles are set for the shape-changing portion 231a. In FIG. 5B, inclination angles Q1 and Q2 of surfaces of the shape-changing portion 231a to the die forging direction (front-rear direction HD) are shown. Because of these inclination angles, the shape-changing portion 231a becomes thinner at the edges.

The angle Q2 between the inner surface of the shape-changing portion 231a and the front-rear direction HD may be a commonly used draft angle (for example, in a range from 0 to 10 degrees). The angle Q1 between the outer surface of the shape-changing portion 231a and the front-rear direction HD is greater than such a commonly used draft angle. The angle Q1 may be, for example, in a range from 10 to 60 degrees. In the example shown in FIG. 5B, the surfaces of the shape-changing portion 231a are plain, but these surfaces may be curved. In the example shown in FIG. 5B, also, the respective centers of the shape-changing portions 231a and 232a with respect to the front-rear direction HD (the parts of the shape-changing portions 231a and 232a above and below the rough web part 220 in the up-down direction VD) sharply project. However, the centers of the shape-changing portions 231a and 232a do not need to have this shape and only need to be thicker than the front and rear parts thereof. For example, the centers of the shape-changing portions 231a and 232a each may have a trapezoidal shape with a flat surface.

A steel material used as a workpiece subjected to the die forging step typically has a proper shape for the die forging. Such a steel material can be produced by a preforming step of preforming a billet that is a starting material. In other words, the steel material may be a preformed product. There is no limit to the preforming step, and a conventional preforming step may be adopted. For example, the preforming step may include a billet rolling step and/or a bending step. The preforming step is typically hot working.

Figure 6A:
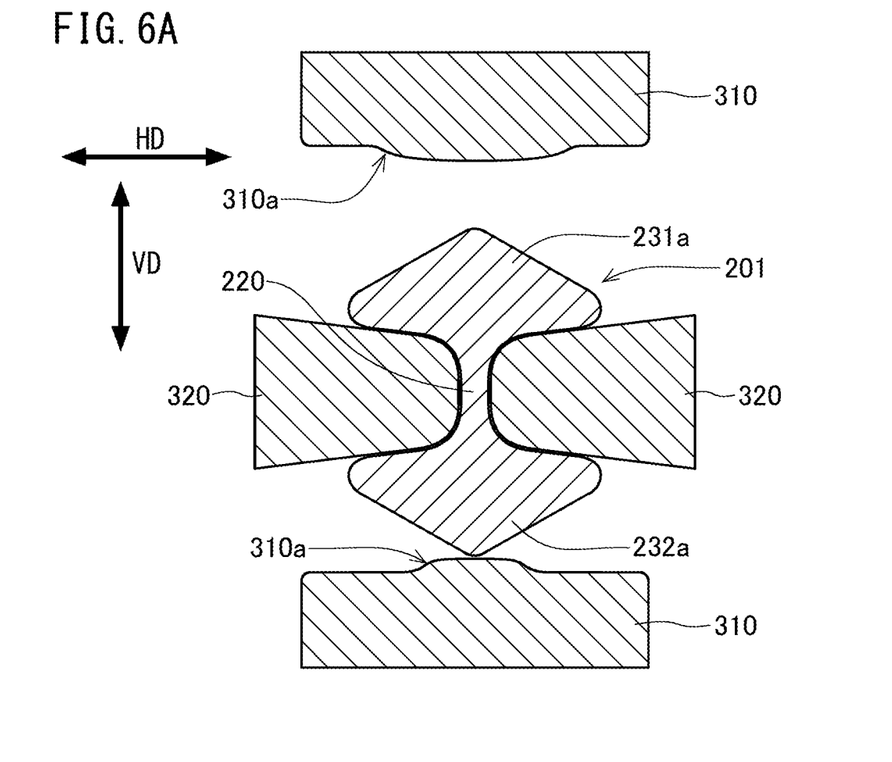
FIG. 6A is a cross-sectional view schematically showing a state before a start of deformation in an exemplary pressing step.
Figure 6B:
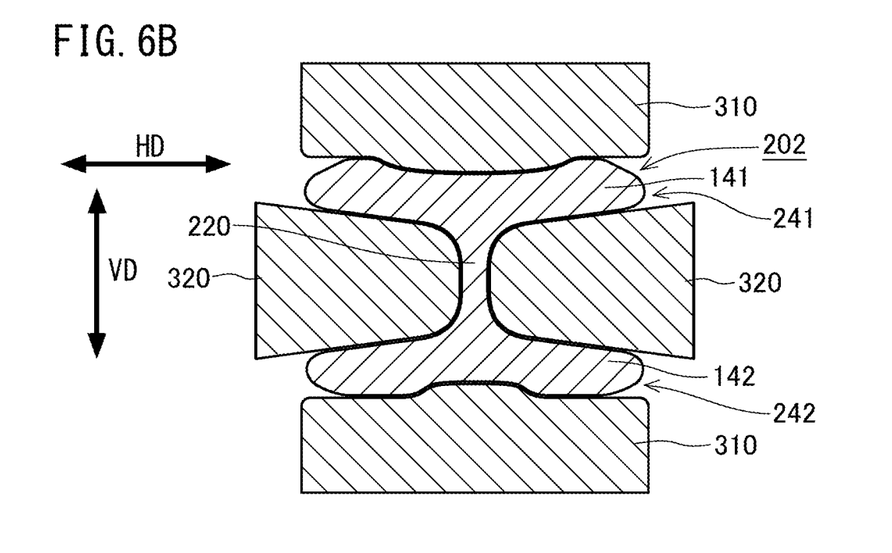
FIG. 6B is a cross-sectional view schematically showing a state on completion of deformation in the exemplary pressing step shown in FIG. 6A.

FIGS. 6A and 6B are sectional views showing an exemplary pressing step. In the pressing step, the first forged product 201 is pressed in the up-down direction VD by at least one first die 310, and thereby, a second forged product 202 is produced. The term "at least one first die 310" means at least one of the upper and lower first dies 310.

In the pressing step, first, as shown in FIG. 6A, the first forged product 201 is placed between the lower first die 310 and the upper first die 310. Each of the first dies 310 has a bulge 310a. One of the first dies 310 moves in the up-down direction VD toward the first forged product 201.

As shown in FIG. 6A, the pressing step may be carried out with the rough web part 220 of the first forged product 201 held between two second dies 320 from front and rear (from the front-rear direction HD). In other words, the pressing step may be carried out with the rough web part 220 held between two second dies 320 from the direction perpendicular to the moving direction of the first die 310. Holding the forged product 201 between the second dies 320 makes it possible to perform the pressing step accurately. Holding the forged product 201 between the second dies 320 further prevents the web part 220 from deforming during the pressing step.

The second dies 320 may have shapes that permit the second dies 320 themselves to tightly contact the inner surfaces of the shape-changing portions 231a and 232a and the surfaces of the rough web part 220, as shown in FIG. 6A. The second dies 320 only need to partly contact the rough web part 220, and the other parts of the second dies 320 (the other parts than the parts to contact the rough web part 220) do not need to contact the shape-changing portions 231a and 232a.

Next, as shown in FIG. 6B, the upper first die 310 is moved down to press the first forged product 201. The regions of the shape-changing portions 231a and 232a on the upper and lower sides of the rough web part 220 (thick parts) and their vicinities are pressed by the first dies 310. Thereby, the material in these regions are caused to flow to the front and rear parts of the first forged product 201, and the thickness-changing portions 141 and 142 are formed. The bulges 310a of the first dies 310 facilitate a flow of the material. Further, the thick parts of the first dies 310 permit a large amount of material to flow.

From another point of view, as shown in FIGS. 4, 5B and 6B, the joined parts to the rough web part 220 (corresponding to the flash lines BL) of the rough flanges 231 and 232 (the shape-changing portions 231a and 232a) are pressed by the first dies 310 from an outer side in the extending direction of the web part 220 in cross section (in the up-down direction VD). Thereby, each of the rough flanges 131 and 132 obtains thick parts (second parts P2) in regions outside of the joined part to the rough web part 220 and obtains a thin part (first part P1) in a central region near the web part 120. The thickness of the thin part is smaller than the maximum thickness of the thick part.

In this way, a second forged product 202 is produced. The second forged product 202 includes a third rough flange 241 with a thickness-changing portion 141, and a fourth rough flange 242 with a thickness-changing portion 142.

By the die forging step and the pressing step described above, the second forged product 202 that has almost the same outer shape as the front axle 100 is obtained. The second forged product 202 may be subjected to various steps as needed. Those steps include, for example, a coining step, a boring step, a heating step, a straightening step, surface-treating step, a coating step, and the like. These steps may be carried out in a conventional manner. Then, the front axle 100 is produced. As described above, the pressing step may double as a coning step.

Examples

The present invention will hereinafter be described in more detail by giving specific examples.

The rigidity of a beam part with a thickness-changing portion, which is an inventive example, and the rigidity of a beam part without a thickness-changing portion, which is a comparative example, were evaluated by simulation. In the simulation, samples each having a length of 100 mm and the same cross-sectional shape at any position in the length direction were used as models. Sample 1 and Sample 2 were assumed to have Young's modulus of 210 GPa and Poisson's ratio of 0.293 as their properties. The simulation was conducted by the finite element method. Sample 1 and Sample 2 were assumed to be equal in mass. In other words, Sample 1 and Sample 2 were assumed to be equal in cross-sectional area along a direction perpendicular to the length direction.

Figure 7:
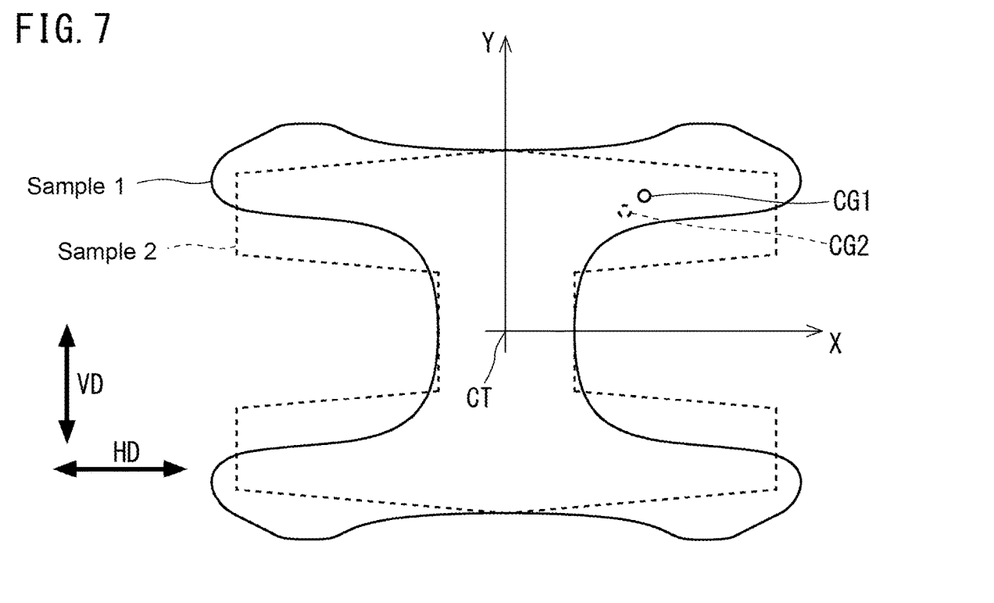
FIG. 7 is a view showing cross-sectional shapes of samples used in a simulation test.

FIG. 7 shows the cross-sectional shape of Sample 1 of an inventive example and the cross-sectional shape of Sample 2 of a comparative example. In the cross section shown in FIG. 7 (in the section along a direction perpendicular to the length direction LD), the sectional shape of Sample 1 and the sectional shape of Sample 2 are both symmetrical laterally and vertically. The flanges of Sample 2 were assumed to protrude frontward and rearward in the front-rear direction HD from the upper side and the lower side of the web part. The draft angle of Sample 2 was assumed to be 5 degrees.

In the sectional view of FIG. 7, an XY coordinate system was assumed with the center of gravity CT of each sample set as an origin. The X axis of the XY coordinate system was parallel to the front-rear direction HD of the beam part, and the Y axis of the XY coordinate system was parallel to the up-down direction VD of the beam part. Then, the center of gravity of the part of each sample in the positive X and positive Y region, that is, the center of gravity of a quarter cross section of each sample was calculated. The center of gravity CG1 of the quarter cross section of Sample 1 and the center of gravity CG2 of the quarter cross section of Sample 2 are shown in FIG. 7. The coordinates of these were as follows. The coordinate values indicate distance (unit: mm).

Center of gravity CG1 of Sample 1: (X, Y)=(21.629, 23.507)

Center of gravity CG2 of Sample 2: (X, Y)=(21.121, 19.812)

As shown above, the X coordinate and the Y coordinate of the center of gravity CG1 of Sample 1 were greater than those of the center of gravity CG2 of Sample 2. The greater X coordinate and the greater Y coordinate bring out an effect that an increase in second moment of area against bending deformation caused by a frontward/rearward load, an increase in polar moment of inertia against torsion, and an increase in second moment of area against bending deformation caused by an upward/downward load are achieved while the weight is kept light.

Figure 8:
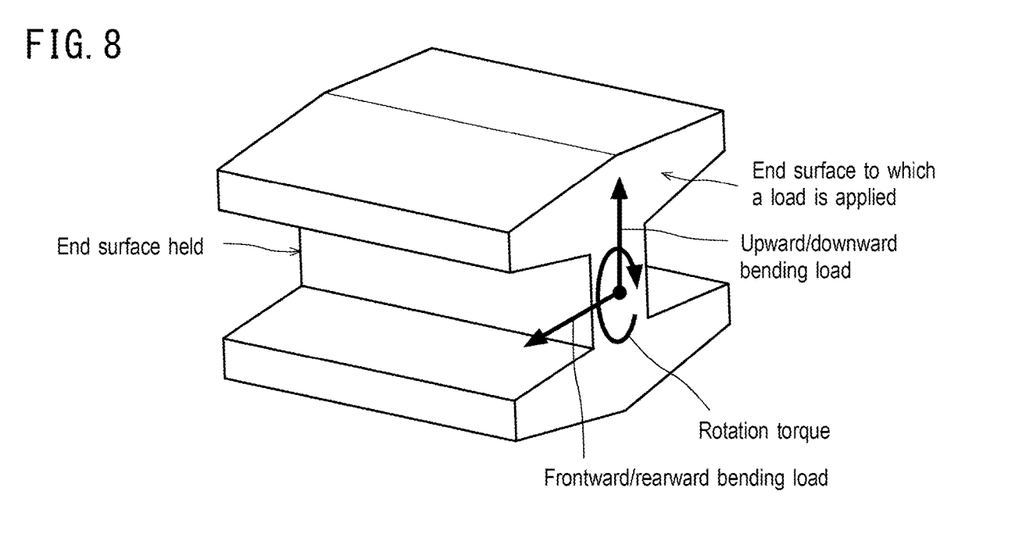
FIG. 8 is a view showing a test method adopted in the simulation test.

Based on the deformation amounts of Sample 1 and Sample 2 caused by applications of loads thereto as shown in FIG. 8, the rigidity of Sample 1 and the rigidity of Sample 2 were calculated by simulation. Specifically, while one end surface was being held, loads were applied to the other end surface in the directions shown in FIG. 8. From the deformation amounts of the part on which the loads were applied, the rigidity was calculated. A deformation amount is inverse proportional to rigidity. The rigidity in the front-rear direction was calculated from the deformation amount caused by application of the frontward/rearward bending load shown in FIG. 8. The rigidity in the up-down direction was calculated from the deformation amount caused by application of the upward/downward bending load shown in FIG. 8. The torsional rigidity was calculated from the deformation amount caused by application of the rotation torque shown in FIG. 8. The results are shown in Table 1.

TABLE 1

| | Rigidity (N/m) | | |
|---|---|---|---|
| | Sample 1 | Sample 2 (Comparative Example) | Rigidity of Sample 1/ Rigidity of Sample 2 (%) |
| Rigidity in Front-Rear Direction | $1.3923 \times 10^6$ | $1.3905 \times 10^6$ | 100.1 |
| Rigidity in Up-Down Direction | $8.0544 \times 10^5$ | $6.3425 \times 10^5$ | 127.0 |
| Torsional Rigidity | $1.2639 \times 10^6$ | $1.2107 \times 10^6$ | 104.4 |

As shown in TABLE 1, the rigidity in the front-rear direction and the torsional rigidity of Sample 1 of an inventive example were higher than those of Sample 2 of a comparative example. The rigidity in the up-down direction of Sample 1 was much higher than that of Sample 2.

The results show that by using a beam part with a thickness-changing portion according to the embodiment in a front axle, it is possible to increase the rigidity of the front axle without increasing the weight. This means that it is possible to reduce the weight of the front axle without decreasing the rigidity. This further means that it is possible to obtain a front axle having a size comparable to or smaller than that of a conventional front axle and having rigidity comparable to or higher than that of the conventional front axle.

INDUSTRIAL APPLICABILITY

The present invention is applicable to front axle beams.

The invention claimed is:

1. A method for producing a front axle beam including a beam part, the beam part including a web part and flanges joined on both sides of the web part and having an H-shaped cross section, the method comprising:
   a step of die forging a material with forging dies paired with each other at a central axis of the web part to form the web part and the flanges such that at least one of the flanges has a maximum thickness at a joined part to the web part, in the cross section of the beam part; and
   a step of pressing the joined part of the flange to the web part with a first die from an outer side in a web part extending direction in the cross section of the beam part to form a thin part and to form thick parts that are thicker than the thin part in regions outside of the joined part of the flange to the web part, wherein:
   the front axle beam comprising the beam part and two king-pin attachment parts provided to both ends of the beam part with respect to a length direction of the beam part,
   the beam part includes a web part extending in the length direction, a first flange protruding frontward and rearward from an upper side of the web part, and a second flange protruding frontward and rearward from a lower side of the web part;
   at least one of the first flange and the second flange includes a thickness-changing portion;
   the thickness-changing portion includes a front part protruding frontward from one side of the upper side and the lower side of the web part and a rear part protruding rearward from the one side of the web part;
   each of the front part and the rear part includes a first part, and a second part that is thicker than the first part and is located farther from the web part than the first part; and
   an outer surface of the thickness-changing portion with respect to an up-down direction of the front axle beam part inclines outward in the up-down direction and thereafter inclines inward in the up-down direction as a distance from the web part increases.

2. The method for producing a front axle beam according to claim 1, wherein the first die presses the joined part of the flange to the web part from an outer side in the web part extending direction in the cross section of the beam part to widen the flange in the cross section of the beam part.

3. The method for producing a front axle beam according to claim 1, wherein the first die presses the joined part of the flange to the web part from an outer side in the web part extending direction in the cross section of the beam part while second dies are pinching the web part and holding the flanges.

4. The method for producing a front axle beam according to claim 1, wherein the first die presses parts of the flange to be formed into the thick parts when pressing the joined part of the flange to the web part from an outer side in the web part extending direction in the cross section of the beam part.

5. A front axle beam comprising a beam part and two king-pin attachment parts provided to both ends of the beam part with respect to a length direction of the beam part, wherein:
   the beam part includes a web part extending in the length direction, a first flange protruding frontward and rearward from an upper side of the web part, and a second flange protruding frontward and rearward from a lower side of the web part;
   at least one of the first flange and the second flange includes a thickness-changing portion;
   the thickness-changing portion includes a front part protruding frontward from any one side of the upper side and lower side of the web part and a rear part protruding rearward from the one side of the web part;
   each of the front part and the rear part includes a first part, and a second part that is thicker than the first part and is located farther from the web part than the first part; and
   an outer surface of the thickness-changing portion with respect to an up-down direction of the front axle beam part inclines outward in the up-down direction and thereafter inclines inward in the up-down direction as a distance from the web part increases.

* * * * *

UNITED STATES PATENT AND TRADEMARK OFFICE
CERTIFICATE OF CORRECTION

| | |
|---|---|
| PATENT NO. | : 11,420,472 B2 |
| APPLICATION NO. | : 16/498168 |
| DATED | : August 23, 2022 |
| INVENTOR(S) | : Kenji Tamura et al. |

It is certified that error appears in the above-identified patent and that said Letters Patent is hereby corrected as shown below:

In the Claims

In Column 17, Line 36, insert --any-- before "one side of the upper side and".

Signed and Sealed this
Eleventh Day of October, 2022

*Katherine Kelly Vidal*

Katherine Kelly Vidal
*Director of the United States Patent and Trademark Office*